United States Patent [19]

Schier

[11] 4,454,031
[45] Jun. 12, 1984

[54] OIL RESERVOIR, IN PARTICULAR FOR HYDRAULIC STEERING SYSTEMS

[75] Inventor: Rainer Schier, Schwäbisch Gmünd, Fed. Rep. of Germany

[73] Assignee: Zahnradfabrik Friedrichshafen AG., Friedrichshafen, Fed. Rep. of Germany

[21] Appl. No.: 423,174

[22] Filed: Sep. 24, 1982

[30] Foreign Application Priority Data

Oct. 21, 1981 [DE] Fed. Rep. of Germany ....... 3141728

[51] Int. Cl.³ .............................................. B01D 35/00
[52] U.S. Cl. ...................................... 210/86; 210/120; 210/172; 210/248; 210/436; 220/374
[58] Field of Search ................ 210/86, 120, 168, 172, 210/237, 238, 248, 352, 171, 246, 435, 436, 451, 472; 180/132; 220/366, 367, 373, 374

[56] References Cited

U.S. PATENT DOCUMENTS

| 1,775,557 | 9/1930 | Hollingsworth | 220/366 |
|---|---|---|---|
| 2,247,445 | 7/1941 | Long | 210/352 |
| 2,459,318 | 1/1949 | Hallinan | 210/120 |
| 3,113,282 | 12/1963 | Coleman | 210/86 |
| 3,271,938 | 9/1966 | Rest | 220/367 |
| 3,389,799 | 6/1968 | Thrasher | 210/436 |
| 4,136,712 | 1/1979 | Nogami | 220/367 |

FOREIGN PATENT DOCUMENTS 1750715  3/1971  Fed. Rep. of Germany .

Primary Examiner—Peter A. Hruskoci
Assistant Examiner—W. Gary Jones
Attorney, Agent, or Firm—Zalkind & Shuster

[57] ABSTRACT

An oil reservoir for a hydraulic steering system is provided with a venting means comprising a sequence of passages from an inner protective pipe movably guided with concentric spacing on a bolt fixed to an oil reservoir housing. The concentric spacing is part of the venting passage wherein venting passes through a groove on the bolt into a venting cap. The venting cap is threadedly carried on a threaded section of the bolt through which the groove passes and effects a portion of the venting passage means. A nut carried by the venting cap effects threaded coaction and may itself have a venting groove. The protective pipe is biased into sealing engagement with the lid by a compression spring. A special construction permits ease of lid removal in conjunction with oil level indicator means.

12 Claims, 1 Drawing Figure

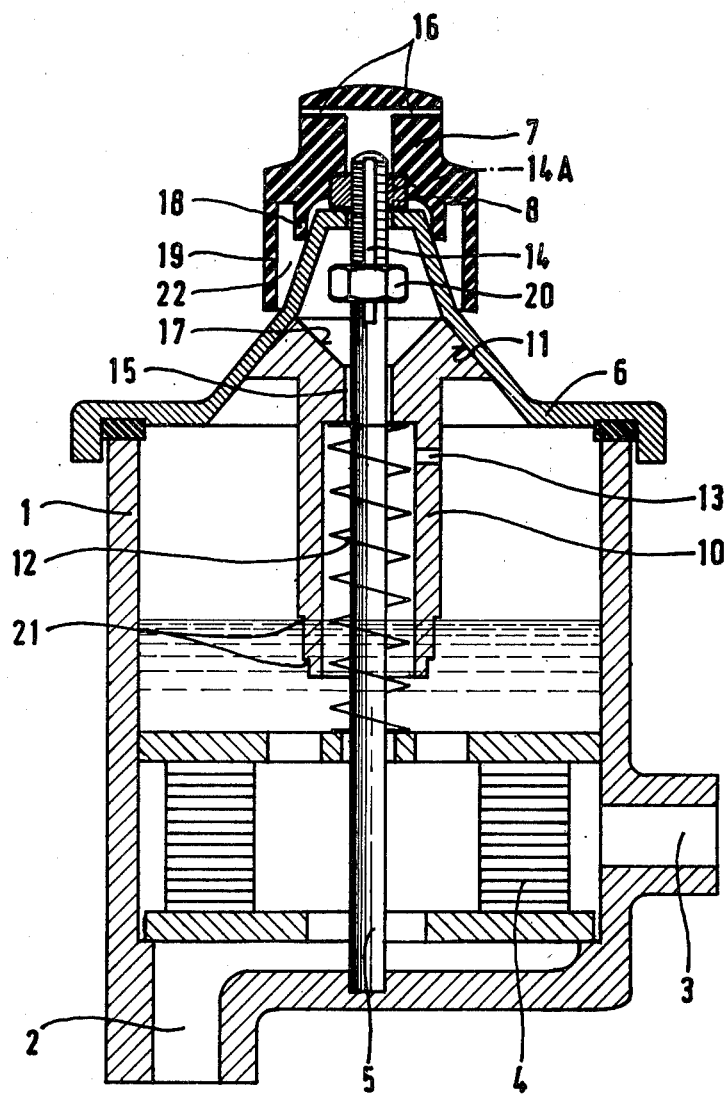

OIL RESERVOIR, IN PARTICULAR FOR HYDRAULIC STEERING SYSTEMS

BACKGROUND OF THE INVENTION

The invention relates to oil reservoirs for hydraulic steering systems along the lines shown in German Patent DE-AS No. 1 750 715. Such reservoirs must be provided with a vent in order to prevent leakage of oil during extreme driving conditions, for example, a rough driving surface, centrifugal force in going around curves, a slanted position of the vehicle. The intrusion of splash or wash water into the oil reservoir housing must also be avoided. While the construction shown in the patent identified above has a labyrinth type screw lid for venting purposes which makes oil leakage difficult, it does not meet the requirements in full, in particular, when used in an all-terrain vehicle.

It has heretofore also been known in the prior art to secure a protective pipe to the lid of an oil reservoir for venting purposes, the pipe surrounding a bolt which extends between the lid and the oil reservoir housing to secure the two together. A relatively narrow protective pipe has an advantage in preventing oil moving about in the reservoir from reaching vent holes provided in the lid. Due to the relatively long protective pipe attached to the lid and the limited height in the engine compartment space in many cases, it is often very difficult to remove the lid in order to check the oil level.

BRIEF DESCRIPTION OF THE INVENTION

In order to overcome the disadvantages of the above constructions as described, the present invention has a construction permitting the lid to be opened without any effort and provides the advantage of a minimum manufacturing cost.

In the instance of the present invention, the protective pipe is biased by a compression spring acting between the inner pipe and an oil filter carried within the oil reservoir housing. The spring effects contiguity between complimentary conical surfaces of the housing lid and the protective pipe, effecting a seal therebetween. An abutment limit stop is carried on the bolt so that when the lid is removed the protective pipe must necessarily remain on the bolt, being movably guided thereby. Accordingly, the lid may be removed without difficulty upon removal of a venting cap carried threadedly on the end of the bolt exterior of the lid. Thus an engine compartment of low height is possible. An air passage means is effected by a sequence of passages involving a radial bore in the protective pipe, a concentric spacing between the protective pipe and the bolt, a groove in the bolt extending from the lid to a venting cap. Thus, air in the housing above the oil carried therein can pass through the several passages outwardly of the reservoir.

Due to an arrangement wherein the protective pipe is not removed with the lid but remains in a raised position on the bolt, lid removal is easy and in raised position oil level can be indicated by markings on the pipe visible in the raised position.

A detailed description of the invention now follows in conjunction with the appended drawing which illustrates a longitudinal section of the components of the invention.

The construction comprises a cylindrical housing 1 having an inlet pipe connection passage 2 and an outlet pipe connection passage 3. A removable filter 4 is carried between the two connection passages, supported on a ledge within the housing. A bolt 5 is anchored at the bottom of the housing and secures a lid 6 against the upper rim of the housing. A vent cap 7 of flexible material, for example, rubber, is threadedly carried on the threaded end section of the bolt as by a nut 8 vulcanized into the vent cap 7.

A protective pipe 10 which is lengthened to prevent oil, sloshing in the reservoir, from reaching the vent passages has an exterior conical surface 11 at one end and is guided on the bolt 5 with a concentric spacing or annular clearance 15, which is a portion of vent passage means. The interior wall of lid 6 is provided with a complimentary conical shape to sealingly meet the conical surface 11 under pressure of a compression spring 12. This effects a seal between the lid and the pipe 10. Thus, the spring is carried interiorly of the pipe 10 and has one end abutting the end of the bore in the pipe in which the spring is carried and the other end abutting the filter 4 to hold it in place.

Upon removal of lid 6, limited motion is permitted for pipe 10 until it abuts a nut 20 carried on the threaded end of bolt 5, as shown. Accordingly, the pipe remains secured to the housing after the lid 6 has been removed. An air vent passage means is provided starting above the expected oil in the housing via a radial bore 13 in pipe 10 and thence through the concentric spacing provided at 15, proceeding to a longitudinal groove 14 cut through the thread of bolt 5 and into vent cap 7 provided with small bore radial passages 16 for venting to the atmosphere.

As an alternative to the groove 14, grooving may be provided inside nut 8, it being noted that the threaded section of bolt 5 has an annular clearance through a bore in the conically shaped end formation of the lid 6 for air passage to grooving which may be provided inside nut 8.

The exterior end 17 of pipe 10 facing the end chamber of lid 6 is funnel shaped so that any oil thrown upwardly through the clearance 15 can flow back readily into the housing.

A labyrinth sealing washer arrangement is provided for the vent cap 7 comprising a lip 18 expandable against the conical end of lid 6 and effecting a seal when cap 7 is screwed into place. Outer flexible lip 19 forms a further seal against the same conical surface. Thus, a chamber 22 is effected between the two sealing lips for pressure reduction of any spray water which may pass lip 19. Accordingly, such water cannot pass lip 18 and is thus prevented from getting into the oil housing. Finally, the lower end of pipe 10 is provided with a step formation 21 as demarcation of oil level in the reservoir.

What is claimed is:

1. A hydraulic steering system oil reservoir of the kind having a cup-shaped housing with an inlet pipe connection (2) and an outlet pipe connection (3) separated by a filter element (6) and also having a lid (11) secured to the housing by means of a bolt (5) secured to the bottom of the housing; wherein venting of the housing is effected through a protective pipe (10) surrounding the bolt and movable thereon and of a length to extend into oil in the housing (8) including a vent cap (7) carried by the bolt into which the bolt protrudes:
   wherein the improvement comprises:
   an abutment element (20) carried on the bolt and effecting a limit stop for movement of the protective pipe on the bolt when the lid is removed from the housing, including a spring (12) effecting bias of said protective pipe towards said lid to effect sealing therebetween, said lid and said protective pipe having sealing means maintained in contiguity by said spring and sealing said housing against venting except through said protective pipe.

2. An oil reservoir as set forth in claim 1, wherein said sealing means comprises an interior cone-shaped surface of said lid and a complimentary exterior cone-shaped surface of said protective pipe.

3. An oil reservoir as set forth in claim 1 including an exterior conical surface (17) on said protective pipe to serve as a funnel for re-entry of oil from said lid into said housing through said pipe.

4. An oil reservoir as set forth in claim 2, including an exterior conical surface (17) on said protective pipe to serve as a funnel for re-entry of oil from said lid into said housing through said pipe.

5. An oil reservoir as set forth in claim 1, wherein said protective pipe is provide with oil level indicator means (21).

6. An oil reservoir as set forth in claim 1, wherein the protective pipe has a transverse bore (13) at a portion above expected oil level within said housing for effecting a vent passage from said housing to said protective pipe, said protective pipe having a concentric spacing (15) around said bolt through which venting from said passage (13) may pass through said lid for venting through said vent cap.

7. An oil reservoir as set forth in claim 1, wherein the bolt (5) has a longitudinal groove (14) within the lid, said groove communicating through said spacing (15) with said vent (13).

8. An oil reservoir as set forth in claim 1, wherein a nut (8) is secured within said vent cap (7) and is provided with an air duct (14a) for venting passage from said lid to said vent cap.

9. An oil reservoir as set forth in claim 1, wherein said vent cap has threaded coaction with said bolt to be secured thereon and said vent groove (14) passes through said nut including venting passage means (16) in said vent cap; wherein said vent cap has a lip (18) sealingly engaging said lid with said vent cap fastened by threaded coaction on said bolt.

10. An oil reservoir as set forth in claim 9, including an additional sealing lip (19) on said vent cap sealingly engageable with said lid and effecting a sealed chamber with said first mentioned sealing lip (18) for neutralizing pressure of spray water to prevent leakage thereof into said housing.

11. A hydraulic steering system oil reservoir of the kind having a cup-shaped housing (1) with an inlet pipe connection and an outlet pipe connection separated by a filter element and also having a lid (11) secured to the housing by means of a bolt (5) secured to the bottom of the housing; wherein venting of the housing is axially effected through a protective pipe (10) having a vent passage therethrough and spacedly surrrounding the bolt and movable thereon and of a length to extend into oil in the housing including a vent cap (7) carried by the bolt into which the bolt protrudes:
wherein the improvement comprises:
means whereby said lid and vent cap are removable from said housing;
an abutment element (20) carried on the bolt and effecting a limit stop for movement of the protective pipe on the bolt when the lid and vent cap are removed from the housing so as to be retained on the bolt, including a spring (12) effecting bias of said protective pipe towards said lid to effect sealing therebetween, said lid and said protective pipe having sealing means maintained in contiguity by said spring.

12. A hydraulic steering system oil reservoir of the kind having a cup-shaped housing with an inlet pipe connection and an outlet pipe connection separated by a filter element and also having a lid secured to the housing by means of a bolt (5) secured to the bottom of the housing; wherein venting of the housing is effected through a protective pipe (10) surrounding the bolt and movable thereon and of a length to extend into oil in the housing including a vent cap (7) removably carried by the bolt into which the bolt protrudes and securing said lid to said housing:
wherein the improvement comprises:
an abutment element (20) carried on the bolt and effecting a limit stop for movement of the protective pipe on the bolt when the lid is removed from the housing, including a spring (12) effecting bias of said protective pipe towards said lid to effect sealing therebetween, said lid and said protective pipe having sealing means maintained in contiguity by said spring;
an annular spacing means for axial vent passage between the bolt and said protective pipe throughout said protective pipe;
said protective pipe having side bore means disposed to be above oil level for vent passage to said annular spacing means;
means (14) effecting continuity of vent passage from said annular spacing to said vent cap.

* * * * *